March 27, 1956     G. A. SCHEIDT     2,739,387
CABLE MEASURING APPARATUS
Filed Nov. 8, 1954
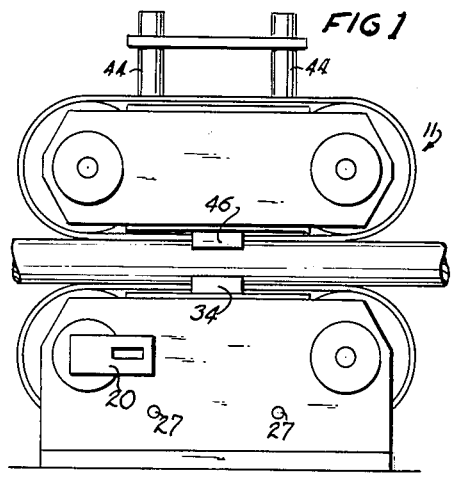
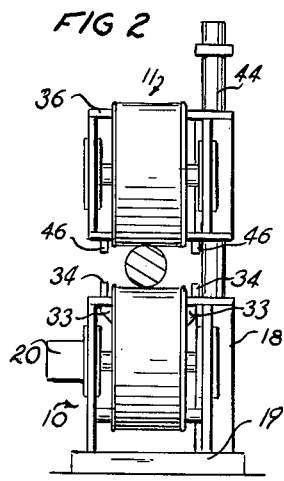
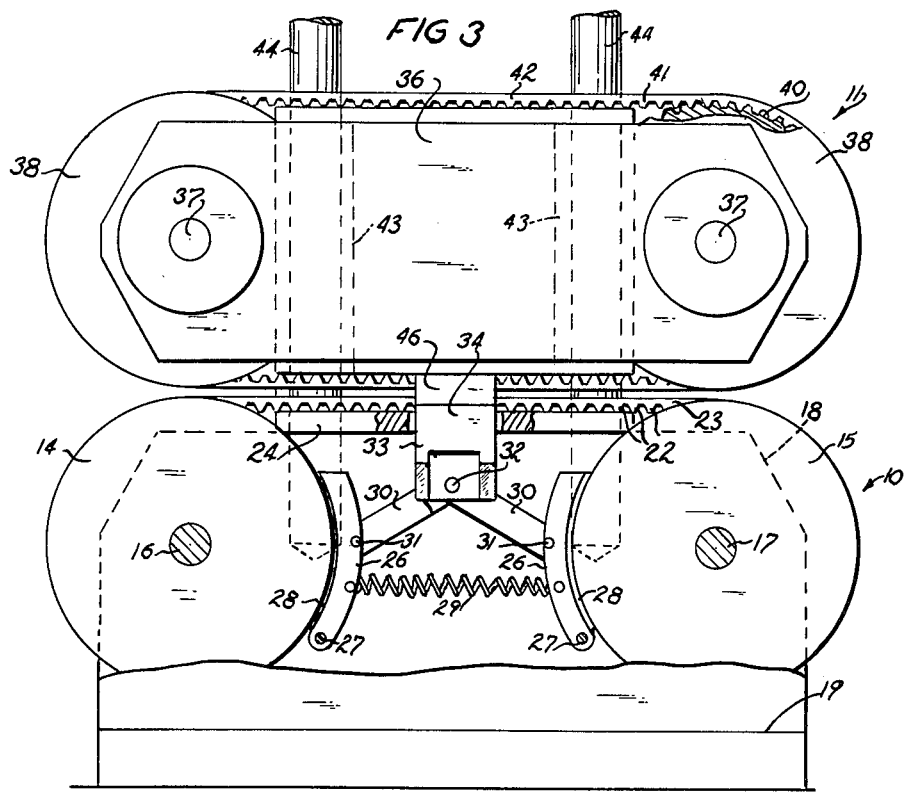
INVENTOR
G. A. SCHEIDT
By W. E. Parnell
ATTORNEY

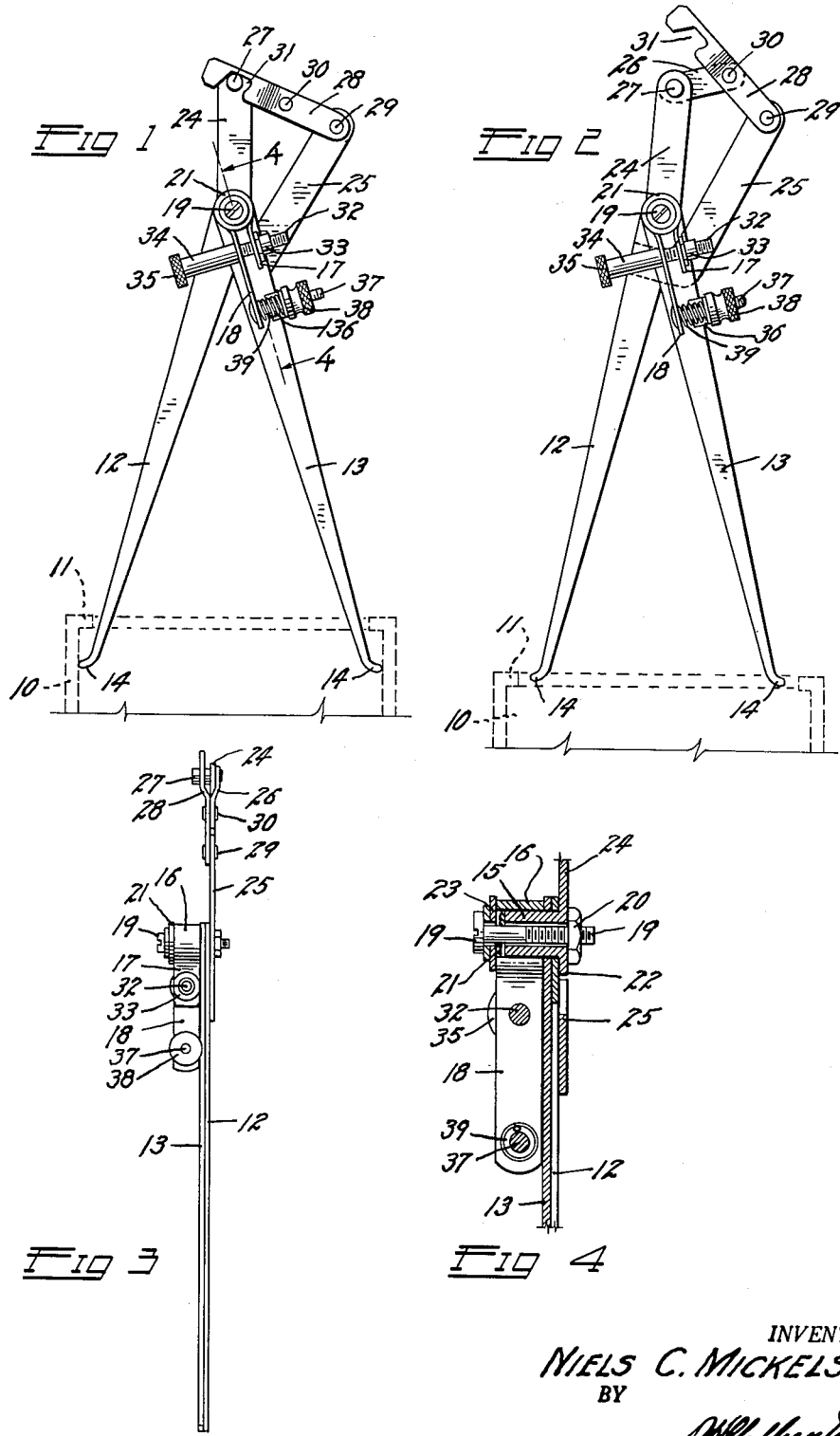

United States Patent Office 2,739,387
Patented Mar. 27, 1956

2,739,387
CABLE MEASURING APPARATUS

Gerald A. Scheidt, Buffalo, N. Y., assignor to Western Electric Company, Incorporated, New York, N. Y., a corporation of New York Application November 8, 1954, Serial No. 467,445

4 Claims. (Cl. 33—134)

This invention relates to cable measuring apparatus, particularly apparatus for measuring varied lengths of cables of various sizes.

Many of the available cable measuring devices work satisfactorily on a single size of cable but are not well adapted to measure cables of widely different sizes.

Accuracy of measurement is important particularly for cables of the larger more costly sizes which must be long enough for a specific run with a minimum excess length to be scrapped. One of the major causes of measurement error is due to bends in the cable which result in a reading different from the actual length of the cable axis. Other causes of error are slip between the roller and the cable sheath and overrun of the roller after the end of the cable has passed.

The object of the invention is an apparatus which is simple in structure, efficient in operation and accurate in measuring lengths of cables of various sizes.

With this and other objects in view, the invention comprises a cable measuring apparatus wherein a measuring roller driven by the longitudinal advancement of a cable to be measured drives a shaft connected to a counter to register the length of each cable. Also, means are adapted to rest on each cable and to operate a brake when the trailing ends of the cables leave the roller to stop rotation of the roller.

In the present embodiment of the invention, measuring and pressure roller and belt units are driven by the longitudinal advancement of cables singly therebetween. The rollers of these units have teeth-like portions for interengaging teeth-like portions on the inner surfaces of their belts to assure positive connections therebetween. Backing plates are also provided for the belts in the cable engaging area between the rollers. The braking means for the measuring unit includes pivotally supported brake shoes connected through links to an actuator and normally held unoperated by springs so that when the pressure unit drops toward the measuring unit as the trailing end of each cable leaves the apparatus, means will strike the actuator to immediately operate the brakes to stop the rollers to produce accurate registration of each length of cable on the counter.

Other objects and advantages will be apparent from the following detailed description when considered in conjunction with the accompanying drawing, wherein:

Fig. 1 is a front elevational view of the apparatus illustrating a measurement of a cable passing therethrough;

Fig. 2 is an end elevational view of the structure shown in Fig. 1; and

Fig. 3 is an enlarged front elevational view of the apparatus shown in closed position.

The apparatus includes a measuring unit 10 and a pressure unit 11. The measuring unit 10 includes rollers 14 and 15 mounted on shafts 16 and 17 which are journalled in suitable bearings in vertical portions 18 of a base 19. The shaft 16 is fixed to the roller 14 and has a counter unit 20 of any commercially known type suitable for this purpose mounted on or operatively connected to the shaft 16. The rollers 14 and 15 have teeth-like portions in their periphery for interengagement with teeth-like portions 22 throughout the inner surface of a belt 23 which extends around the rollers. A backing plate 24 supported by the vertical portions 18 of the base 19 extends substantially the full length of the cable engaging area between the rollers 14 and 15 to support the belt and assure driving connection between the belt and the cable. Brakes 26 pivotally supported at 27 have brake shoes 28 of suitable material for engaging the peripheries of their respective rollers 14 and 15 to stop rotation of the rollers when the brakes are operated. One or more springs 29 connecting the brakes 26, normally urge them inwardly toward each other about their pivots 27. Links 30 have their outer ends pivotally connected at 31 to the brakes 26 and their inner ends pivotally connected at 32 to an actuator 33 which extends laterally beneath the upper central portion of the belt 23 and is provided with projections 34 adapted to extend above the plane of the belt as shown in Fig. 2.

The pressure unit 11 includes a carriage 36 supporting bearings for shafts 37 upon which rollers 38 are mounted. The rollers 38 have teeth-like portions 40 in their peripheries for interengagement with teeth-like portions 41 of a belt 42 to assure positive driving connection between the belt and pulleys. The carriage 36 carries bearings 43 so that the carriage may be slidably mounted on parallel vertical rods 44. The rods are supported in the base 19, of the unit 10, or in one of the vertical portions 18 thereof to assure alignment of the pressure unit with the measuring unit. The carriage 36 has projections 46 mounted on the undersurface thereof and in alignment with the projections 34 of the actuator 33 to cause immediate operation of the brakes when the unit 11 is free to drop toward the unit 10.

Considering now the operation of the measuring apparatus, it will be apparent that the pressure unit 11 is free to be raised manually, through the force of each cable entering the apparatus or by any suitable means (not shown) so as to rest upon each cable passing through the apparatus and free to drop toward the measuring unit 10 when the trailing end of each cable leaves the measuring area or passes from between the units 10 and 11. The moment the unit 11 is raised to receive each new cable, regardless of the size thereof, the springs 29 free the unit 10 of the braking force and allow the units to be driven by the cable being measured.

If desired, each measuring operation may begin with the leading end of the cable at the exit end of the apparatus, that is, at a point in substantial alignment with the plane intersecting the axes of the exit rollers so that when the trailing end of the cable passes beyond this position, the unit 11 will drop immediately to the position shown in Fig. 3. When this occurs, the projections 46 of the unit 11 will strike the projections 34 of the actuator 33 moving the actuator downwardly to move the links 30 to force the brakes 26 outwardly away from each other about their pivots 27 to apply braking forces to the rollers 14 and 15 to stop them immediately after the trailing end of each cable leaves the units, thus assuring accurate measurement of each cable as indicated by the counter Therefore, with the aid of cable guiding apparatus (not shown) disposed adjacent the entrance and exit ends of the cable measuring apparatus, cables of desired lengths will be measured. This assures a straight cable portion in the area between the guiding apparatus occupied by the measuring apparatus and with the positive elimination of slip, due to the belt and pulley units, and the elimination of overrun due to the quick acting brakes, there will be no loss resulting from over or under measurements of the cables.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A cable measuring apparatus comprising a shaft supported for rotation at a fixed position, a measuring roller fixedly mounted thereon, a counter driven by the shaft to indicate the lengths of cables singly passing over and thereby driving the roller, a brake operable to stop rotation of the roller normally held unoperated to free the roller for rotation, a pressure roller, means to support the pressure roller whereby it may rest on each cable passing over the measuring roller and drop toward the measuring roller as each cable leaves the measuring roller, and means movable with the pressure roller to operate the brake.

2. A cable measuring apparatus comprising measuring and pressure roller and belt units driven by longitudinal advancement of cables singly therebetween, the measuring unit being supported at a fixed position and having a shaft driven by one of the rollers thereof, a counter driven by the shaft to register the length of each cable, brakes operable to stop rotation of the rollers and belt of the measuring unit, means normally holding the brakes unoperated, means to support the pressure unit whereby it will rest on each cable passing over the measuring unit and drop toward the measuring unit as each cable passes from between the units, and means carried by the pressure unit to operate the brakes.

3. A cable measuring apparatus comprising measuring and pressure roller and belt units driven by longitudinal advancement of cables singly therebetween, the rollers of the units having teeth-like portions for interengaging teeth-like portions on inner surfaces of their belts, the measuring unit being supported at a fixed position and having a shaft driven by one of the rollers thereof, a counter driven by the shaft to register the length of each cable, brakes operable to stop rotation of the rollers and belt of the measuring unit, means normally holding the brakes unoperated, means to support the pressure unit whereby it will rest on each cable passing over the measuring unit and drop toward the measuring unit as each cable passes from between the units, and means carried by the pressure unit to operate the brakes.

4. A cable measuring apparatus comprising measuring and pressure roller and belt units driven by longitudinal advancement of cables singly therebetween, the rollers of the units having teeth-like portions for interengaging teeth-like portions on inner surfaces of their belts, backing plates for the belts in the cable engaging area between the rollers, the measuring unit being supported at a fixed position and having a shaft driven by one of the rollers thereof, a counter driven by the shaft to register the length of each cable, brakes operable to stop rotation of the rollers and belt of the measuring unit, means normally holding the brakes unoperated, means to support the pressure unit whereby it will rest on each cable passing over the measuring unit and drop toward the measuring unit as each cable passes from between the units, and means carried by the pressure unit to operate the brakes.

References Cited in the file of this patent

UNITED STATES PATENTS

| | | |
|---|---|---|
| 1,491,502 | Wheeler | Apr. 22, 1924 |

FOREIGN PATENTS

| | | |
|---|---|---|
| 414,437 | Great Britain | Aug. 9, 1934 |
| 448,730 | Great Britain | June 15, 1936 |